US008167045B2

(12) United States Patent
Nguyen et al.

(10) Patent No.: US 8,167,045 B2
(45) Date of Patent: May 1, 2012

(54) METHODS AND COMPOSITIONS FOR STABILIZING FORMATION FINES AND SAND

(75) Inventors: Philip D. Nguyen, Duncan, OK (US); Jimmie D. Weaver, Duncan, OK (US); David L. Brown, Temple, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 328 days.

(21) Appl. No.: 12/386,293

(22) Filed: Apr. 16, 2009

(65) Prior Publication Data

US 2009/0205830 A1 Aug. 20, 2009

Related U.S. Application Data

(60) Continuation-in-part of application No. 12/256,644, filed on Oct. 23, 2008, now Pat. No. 7,766,099, which is a continuation-in-part of application No. 11/526,181, filed on Sep. 22, 2006, now abandoned, which is a division of application No. 10/650,065, filed on Aug. 26, 2003, now Pat. No. 7,156,194.

(51) Int. Cl.
*E21B 33/13* (2006.01)
*E21B 43/22* (2006.01)

(52) U.S. Cl. .............. 166/300; 166/279; 166/293

(58) Field of Classification Search .............. None
See application file for complete search history.

(56) References Cited

U.S. PATENT DOCUMENTS

| | | | |
|---|---|---|---|
| 3,052,298 A | 9/1962 | Malott | |
| 3,070,165 A | 12/1962 | Stratton | |
| 3,173,484 A | 3/1965 | Huitt et al. | |
| 3,195,635 A | 7/1965 | Fast | |
| 3,302,719 A | 2/1967 | Fischer | |
| 3,308,886 A | 3/1967 | Evans | |
| 3,329,204 A | 7/1967 | Brieger | |
| 3,364,995 A | 1/1968 | Atkins et al. | |
| 3,366,178 A | 1/1968 | Malone et al. | |
| 3,378,074 A | 4/1968 | Kiel | |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,525,398 A | 8/1970 | Fisher | |
| 3,565,176 A | 2/1971 | Clifford | |
| 3,592,266 A | 7/1971 | Tinsley | |
| 3,709,641 A | 1/1973 | Sarem | |
| 3,741,308 A | 6/1973 | Veley | |
| 3,769,070 A | 10/1973 | Schilt | |
| 3,850,247 A | 11/1974 | Tinsley | |
| 3,861,467 A | 1/1975 | Harnsberger | |
| 3,933,205 A | 1/1976 | Kiel | |
| 4,000,781 A | 1/1977 | Knapp | |
| 4,018,285 A | 4/1977 | Watkins et al. | |
| 4,060,988 A | 12/1977 | Arnold | |
| 4,068,718 A | 1/1978 | Cooke, Jr. et al. | |
| 4,073,343 A * | 2/1978 | Harnsberger | 166/295 |
| 4,085,802 A | 4/1978 | Sifferman et al. | |
| 4,089,437 A | 5/1978 | Chutter et al. | |
| 4,247,430 A | 1/1981 | Constien | |
| 4,259,205 A | 3/1981 | Murphey | |
| 4,392,988 A | 7/1983 | Dobson et al. | |
| 4,399,866 A | 8/1983 | Dearth | |
| 4,428,427 A | 1/1984 | Friedman | |
| 4,441,556 A | 4/1984 | Powers et al. | |
| 4,669,543 A | 6/1987 | Young | 166/276 |
| 4,670,501 A | 6/1987 | Dymond et al. | |
| 4,681,165 A | 7/1987 | Bannister | |
| 4,772,646 A | 9/1988 | Harms et al. | |
| 4,777,200 A | 10/1988 | Dymond et al. | |
| 4,842,070 A | 6/1989 | Sharp | |
| 4,875,525 A | 10/1989 | Mana | |
| 4,892,147 A | 1/1990 | Jennings, Jr. et al. | |
| 4,898,750 A | 2/1990 | Friedman et al. | |
| 4,921,576 A | 5/1990 | Hurd | |
| 4,984,635 A | 1/1991 | Cullick et al. | |
| 5,005,647 A | 4/1991 | Friedman et al. | 166/295 |
| 5,056,597 A | 10/1991 | Stowe, III et al. | |
| 5,095,987 A | 3/1992 | Weaver et al. | |
| 5,244,362 A | 9/1993 | Conally et al. | |
| 5,249,627 A | 10/1993 | Harms et al. | |
| 5,265,678 A | 11/1993 | Grundmann | |
| 5,278,203 A | 1/1994 | Harms | |
| 5,377,756 A | 1/1995 | Northrop et al. | |

(Continued)

FOREIGN PATENT DOCUMENTS

EP 0506934 10/1992

(Continued)

OTHER PUBLICATIONS

"Santrol Bioballs"; http://www.fairmounminerals.com/.sub.--SANTROL/SANTROL%20Web%20Site/B.sub- .--TD.htm, Sep. 30, 2004.
International Search Report and Opinion (PCT/GB2004/002412), Sep. 16, 2004.
International Search Report and Opinion (PCT/GB2005/003845), Jul. 31, 2006.
International Search Report and Opinion (PCT/GB2005/004009), Jan. 11, 2006.
International Search Report (CPW 21582 EP), Mar. 11, 2005.
International Search Report and Opinion (PCT/GB2004/001497), Jul. 20, 2004.
International Search Report and Opinion (PCT/GB2004/001842), Dec. 10, 2004.

(Continued)

*Primary Examiner* — Zakiya W Bates
(74) *Attorney, Agent, or Firm* — Robert A. Kent; McDermott Will & Emery LLP

(57) ABSTRACT

Methods comprising providing a polymerizable treatment fluid that comprises furfuryl alcohol monomer dispersed in an aqueous base fluid; introducing the polymerizable treatment fluid to a portion of a subterranean formation; and allowing the polymerizable treatment fluid to polymerize in the subterranean formation. The methods may include the use of contacting the furfuryl alcohol with an initiator to begin polymerization.

19 Claims, 1 Drawing Sheet

U.S. PATENT DOCUMENTS

| | | | |
|---|---|---|---|
| 5,390,741 A | 2/1995 | Payton et al. | |
| 5,403,822 A | 4/1995 | Mueller et al. | |
| 5,420,174 A | 5/1995 | Dewprashad | |
| 5,492,177 A | 2/1996 | Yeh et al. | |
| 5,492,178 A | 2/1996 | Nguyen et al. | |
| 5,663,123 A | 9/1997 | Goodhue, Jr. et al. | |
| 5,697,448 A | 12/1997 | Johnson | |
| 5,701,956 A | 12/1997 | Hardy et al. | |
| 5,738,136 A | 4/1998 | Rosenberg | |
| 5,836,393 A | 11/1998 | Johnson | |
| 5,901,789 A | 5/1999 | Donnelly et al. | |
| 5,944,106 A | 8/1999 | Dalrymple et al. | |
| 5,960,784 A | 10/1999 | Ryan | |
| 5,960,878 A | 10/1999 | Nguyen et al. | |
| 5,969,823 A | 10/1999 | Wurz et al. | |
| 6,063,738 A | 5/2000 | Chatterji et al. | |
| 6,070,667 A | 6/2000 | Gano | |
| 6,131,661 A | 10/2000 | Conner et al. | |
| 6,143,698 A | 11/2000 | Murphey et al. | |
| 6,165,947 A | 12/2000 | Chang et al. | |
| 6,177,484 B1 * | 1/2001 | Surles | 166/295 |
| 6,186,228 B1 | 2/2001 | Wegener et al. | |
| 6,302,207 B1 | 10/2001 | Nguyen et al. | |
| 6,310,008 B1 | 10/2001 | Rietjens | |
| 6,315,040 B1 | 11/2001 | Donnelly | |
| 6,342,467 B1 | 1/2002 | Chang et al. | |
| 6,394,181 B2 | 5/2002 | Schnatzmeyer et al. | |
| 6,405,796 B1 | 6/2002 | Meyer et al. | |
| 6,415,509 B1 | 7/2002 | Echols et al. | |
| 6,422,183 B1 | 7/2002 | Kato | |
| 6,450,260 B1 | 9/2002 | James et al. | |
| 6,457,518 B1 | 10/2002 | Castano-Mears et al. | |
| 6,478,092 B2 | 11/2002 | Voll et al. | |
| 6,488,763 B2 | 12/2002 | Brothers et al. | |
| 6,510,896 B2 | 1/2003 | Bode et al. | |
| 6,520,255 B2 | 2/2003 | Tolman et al. | |
| 6,534,449 B1 | 3/2003 | Gilmour et al. | |
| 6,536,939 B1 | 3/2003 | Blue | |
| 6,550,959 B2 | 4/2003 | Huber et al. | |
| 6,588,926 B2 | 7/2003 | Huber et al. | |
| 6,588,928 B2 | 7/2003 | Huber et al. | |
| 6,609,578 B2 | 8/2003 | Patel et al. | |
| 6,677,426 B2 | 1/2004 | Noro et al. | |
| 6,705,400 B1 | 3/2004 | Nguyen et al. | |
| 6,725,930 B2 | 4/2004 | Boney et al. | |
| 6,729,405 B2 | 5/2004 | DiLullo et al. | |
| 6,776,235 B1 | 8/2004 | England | |
| 6,832,655 B2 | 12/2004 | Ravensbergen et al. | |
| 6,837,309 B2 | 1/2005 | Boney et al. | |
| 6,866,099 B2 | 3/2005 | Nguyen | |
| 6,881,709 B2 | 4/2005 | Nelson et al. | |
| 6,962,200 B2 | 11/2005 | Nguyen et al. | |
| 6,997,259 B2 | 2/2006 | Nguyen | |
| 7,008,984 B2 | 3/2006 | Schneider | 524/13 |
| 7,013,976 B2 | 3/2006 | Nguyen et al. | |
| 7,017,665 B2 | 3/2006 | Nguyen | |
| 7,025,134 B2 | 4/2006 | Byrd et al. | |
| 7,028,774 B2 | 4/2006 | Nguyen et al. | |
| 7,032,667 B2 | 4/2006 | Nguyen et al. | |
| 7,036,589 B2 | 5/2006 | Nguyen | |
| 7,040,403 B2 | 5/2006 | Nguyen et al. | |
| 7,059,406 B2 | 6/2006 | Nguyen | |
| 7,063,150 B2 | 6/2006 | Slabaugh et al. | |
| 7,066,258 B2 | 6/2006 | Justus et al. | |
| 7,073,581 B2 | 7/2006 | Nguyen et al. | |
| 7,080,688 B2 | 7/2006 | Todd et al. | |
| 7,081,439 B2 | 7/2006 | Sullivan et al. | |
| 7,093,658 B2 | 8/2006 | Chatterji et al. | |
| 7,104,325 B2 | 9/2006 | Nguyen et al. | |
| 7,114,560 B2 | 10/2006 | Nguyen et al. | |
| 7,114,570 B2 | 10/2006 | Nguyen et al. | |
| 7,117,942 B2 | 10/2006 | Dalrymple et al. | |
| 7,131,491 B2 | 11/2006 | Blauch et al. | |
| 7,153,575 B2 | 12/2006 | Anderson et al. | |
| 7,156,194 B2 | 1/2007 | Nguyen | |
| 7,178,596 B2 | 2/2007 | Blauch et al. | |
| 7,204,311 B2 | 4/2007 | Welton et al. | |
| 7,210,528 B1 | 5/2007 | Brannon et al. | |
| 7,216,711 B2 | 5/2007 | Nguyen et al. | |
| 7,252,146 B2 | 8/2007 | Slabaugh et al. | |
| 7,261,156 B2 | 8/2007 | Nguyen et al. | |
| 7,264,051 B2 | 9/2007 | Nguyen et al. | |
| 7,264,052 B2 | 9/2007 | Nguyen et al. | |
| 7,267,717 B2 | 9/2007 | Watanabe et al. | |
| 7,273,099 B2 | 9/2007 | East, Jr. et al. | |
| 7,281,581 B2 | 10/2007 | Nguyen et al. | |
| 7,306,037 B2 | 12/2007 | Nguyen et al. | |
| 7,343,973 B2 | 3/2008 | Dusterhoft et al. | |
| 7,345,011 B2 | 3/2008 | Nguyen et al. | 507/220 |
| 7,347,264 B2 | 3/2008 | Nguyen | 166/272.3 |
| 1,208,064 A1 | 4/2008 | Dalrymple et al. | |
| 2002/0036088 A1 | 3/2002 | Todd | |
| 2002/0104217 A1 | 8/2002 | Echols et al. | |
| 2002/0160920 A1 | 10/2002 | Dawson et al. | |
| 2002/0169085 A1 | 11/2002 | Miller et al. | |
| 2002/0189808 A1 | 12/2002 | Nguyen et al. | |
| 2003/0013871 A1 | 1/2003 | Mallon et al. | |
| 2003/0106690 A1 | 6/2003 | Boney et al. | |
| 2003/0114317 A1 | 6/2003 | Benton et al. | |
| 2003/0230431 A1 | 12/2003 | Reddy et al. | |
| 2004/0040712 A1 | 3/2004 | Ravi et al. | |
| 2004/0043906 A1 | 3/2004 | Heath et al. | |
| 2004/0045712 A1 | 3/2004 | Eoff et al. | |
| 2004/0060702 A1 | 4/2004 | Kotlar et al. | |
| 2004/0152602 A1 | 8/2004 | Boles | |
| 2004/0194961 A1 | 10/2004 | Nguyen et al. | |
| 2004/0261993 A1 | 12/2004 | Nguyen | |
| 2004/0261999 A1 | 12/2004 | Nguyen | |
| 2005/0000694 A1 | 1/2005 | Dalrymple et al. | |
| 2005/0028976 A1 | 2/2005 | Nguyen | |
| 2005/0028979 A1 | 2/2005 | Brannon et al. | |
| 2005/0034865 A1 | 2/2005 | Todd et al. | |
| 2005/0126780 A1 | 6/2005 | Todd et al. | |
| 2005/0139359 A1 | 6/2005 | Maurer et al. | |
| 2005/0178551 A1 | 8/2005 | Tolman et al. | |
| 2005/0194135 A1 | 9/2005 | Nguyen et al. | |
| 2005/0194136 A1 | 9/2005 | Nguyen et al. | |
| 2005/0194140 A1 | 9/2005 | Dalrymple et al. | |
| 2005/0207001 A1 | 9/2005 | Laufer et al. | |
| 2005/0257929 A1 | 11/2005 | Nguyen et al. | |
| 2005/0267001 A1 | 12/2005 | Weaver et al. | |
| 2005/0269101 A1 | 12/2005 | Stegent et al. | |
| 2005/0274520 A1 | 12/2005 | Nguyen et al. | |
| 2005/0284632 A1 | 12/2005 | Dalrymple et al. | |
| 2006/0048943 A1 | 3/2006 | Parker et al. | |
| 2006/0048944 A1 | 3/2006 | van Batenburg et al. | |
| 2006/0052251 A1 | 3/2006 | Anderson et al. | |
| 2006/0089266 A1 | 4/2006 | Dusterhoft et al. | |
| 2006/0113078 A1 | 6/2006 | Nguyen et al. | |
| 2006/0124303 A1 | 6/2006 | Nguyen et al. | |
| 2006/0124309 A1 | 6/2006 | Nguyen et al. | |
| 2006/0137875 A1 | 6/2006 | Dusterhoft et al. | |
| 2006/0157243 A1 | 7/2006 | Nguyen | |
| 2006/0175058 A1 | 8/2006 | Nguyen | |
| 2006/0219405 A1 | 10/2006 | Nguyen et al. | |
| 2006/0219408 A1 | 10/2006 | Nguyen et al. | |
| 2006/0234874 A1 | 10/2006 | Eoff et al. | |
| 2006/0240994 A1 | 10/2006 | Eoff et al. | |
| 2006/0240995 A1 | 10/2006 | Rickman et al. | |
| 2006/0260810 A1 | 11/2006 | Weaver et al. | |
| 2006/0260813 A1 | 11/2006 | Welton et al. | |
| 2006/0264332 A1 | 11/2006 | Welton et al. | |
| 2006/0266522 A1 | 11/2006 | Eoff et al. | |
| 2006/0283592 A1 | 12/2006 | Sierra et al. | |
| 2006/0289160 A1 | 12/2006 | van Batenburg et al. | |
| 2007/0007010 A1 | 1/2007 | Welton et al. | |
| 2007/0012445 A1 | 1/2007 | Nguyen et al. | |
| 2007/0114032 A1 | 5/2007 | Stegent et al. | |
| 2007/0131422 A1 | 6/2007 | Gatlin et al. | |
| 2007/0131425 A1 | 6/2007 | Gatlin et al. | |
| 2007/0267194 A1 | 11/2007 | Nguyen et al. | |
| 2008/0006406 A1 | 1/2008 | Nguyen et al. | |

FOREIGN PATENT DOCUMENTS

| | | |
|---|---|---|
| EP | 1607572 | 12/2005 |
| GB | 2298440 | 9/1996 |
| WO | WO 2004/009956 | 1/2004 |

| WO | WO 2004/083600 | 9/2004 |
| WO | WO 2004090281 | 10/2004 |
| WO | WO 2004104368 | 12/2004 |
| WO | WO 2005080749 | 9/2005 |

OTHER PUBLICATIONS

International Search Report and Opinion (PCT/GB2004/002674), Dec. 16, 2004.
International Search Report and Opinion (PCT/GB2004/002968), Nov. 16, 2004.
International Search Report and Opinion (PCT/GB2004/004242), Feb. 10, 2005.
International Search Report and Opinion (PCT/GB2004-000689), Jun. 4, 2004.
International Search Report and Opinion (PCT/GB2004/002727), Mar. 11, 2005.
International Search Report and Opinion (PCT/GB2004/002747), Mar. 11, 2005.
International Search Report and Opinion (PCT/GB2005/004010), Feb. 21, 2006.
International Search Report and Opinion (PCT/GB2006/004102), Feb. 20, 2007.
International Search Report and Opinion (PCT/GB2006/004137), Jun. 5, 2008.
International Search Report and Opinion (PCT/GB2006/004852), Mar. 7, 2007.
International Search Report and Opinion (PCT/GB2006/000366), Jun. 22, 2006.
International Search Report and Opinion (PCT/GB2005/003747), Dec. 12, 2005.
International Search Report and Opinion (PCT/GB2004/002948), May 24, 2005.
International Search Report and Opinion (PCT/GB2005/000637), Jun. 2, 2005.
International Search Report and Opinion (PCT/GB2005/000634), Aug. 6, 2005.
International Preliminary Report on Patentability (PCT/GB2005/000634), Sep. 14, 2006.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., "Controlling Proppant Flowback in High-Temperature, High-Production Wells, "SPE 82215, May 2003.
Dusterhoft, et al., "Maximizing Effective Proppant Permeability Under High-Stress, High Gas-Rate Conditions," SPE 90398, Sep. 2004.
"Sanfix A Resin" Halliburton Product Sheet, Jan. 2008.

* cited by examiner

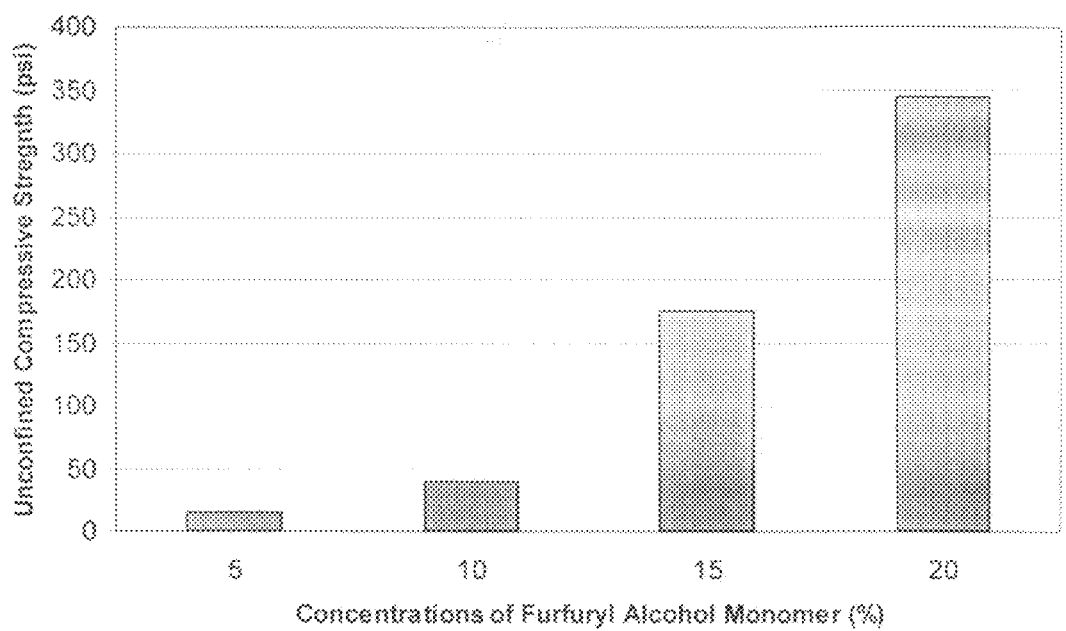

METHODS AND COMPOSITIONS FOR STABILIZING FORMATION FINES AND SAND

CROSS-REFERENCE TO RELATED APPLICATIONS

The present application is a continuation-in-part of U.S. patent application Ser. No. 12/256,644, filed Oct. 23, 2008 now U.S. Pat. No. 7,766,099, which is a continuation-in-part of U.S. patent application Ser. No. 11/526,181, filed Sep. 22, 2006 now abandoned, which is a divisional of Ser. No. 10/650,065, now U.S. Pat. No. 7,156,194, filed Aug. 26, 2003, all of which are incorporated by reference herein for all purposes.

BACKGROUND

The present invention relates to methods and compositions useful in treating existing or placed solids in subterranean formations, and more particularly, to stabilizing relatively unconsolidated portions of subterranean formations, and minimizing the flow back and/or production of unconsolidated particulate material (referred to collectively herein as "particulate migration").

In the production of hydrocarbons from a subterranean formation, the subterranean formation preferably should be sufficiently conductive to permit desirable fluids, such as oil and gas, to flow to a well bore that penetrates the formation. One type of treatment that may be used to increase the conductivity of a subterranean formation is hydraulic fracturing. Hydraulic fracturing operations generally involve pumping a treatment fluid (e.g., a fracturing fluid or a "pad" fluid) into a well bore that penetrates a subterranean formation at a sufficient hydraulic pressure to create or enhance one or more fractures in the subterranean formation. The fluid used in the treatment may comprise particulates, often referred to as "proppant particulates," that are deposited in the resultant fractures. These proppant particulates are thought to prevent the fractures from fully closing upon the release of hydraulic pressure, forming conductive channels through which fluids may flow to a well bore.

A type of particulate migration that may negatively affect fluid conductivity in a subterranean formation is the flow back of unconsolidated particulate material (e.g., formation fines, sand, proppant particulates, etc.) through the conductive channels in the subterranean formation, which can, for example, clog the conductive channels and/or damage the interior of the formation or equipment. Production of proppant and formation sand can be problematic because these solids often cause equipment damage, necessitate costly cleanup treatments, and cause potential loss of hydrocarbon production. There are several known techniques used to control particulate migration.

One well-known technique used to control particulate migration in subterranean formations is commonly referred to as "gravel packing," which involves the placement of a filtration bed of gravel particulates in the subterranean formation, which acts as a barrier to prevent particulates from flowing into the well bore. These gravel packing operations may involve the use of consolidating agents to bind the gravel particulates together in order to form a porous matrix through which formation fluids can pass. In some situations, hydraulic-fracturing operations and gravel-packing operations may be combined into a single operation to stimulate production and to reduce the production of unconsolidated formation particulates. Such treatments are often referred to as "frac-pack" operations. In some cases, these treatments are completed with a gravel-pack screen assembly in place with the fracturing fluid being pumped through the annular space between the casing and screen. In such a situation, the fracturing operation may end in a screen-out condition creating an annular gravel pack between the screen and casing. Another technique that has been used to control particulate migration involves coating proppant particulates with a consolidating agent to facilitate their consolidation within the formation and to prevent their subsequent flow-back through the conductive channels in the subterranean formation. Still another method used to control particulate migration involves consolidating unconsolidated portions of subterranean zones into relatively stable permeable masses by applying a consolidating agent to an unconsolidated portion of the subterranean formation. One example of this method is applying a curable resin to a portion of the zone, followed by a spacer fluid and then a catalyst. Another example of this method involves applying a tackifying composition (aqueous or non-aqueous) to a portion of the formation in an effort to reduce the migration of particulates therein.

Heretofore, many of the well known consolidating agents that have been used in subterranean formations have been introduced to the subterranean formation in a solvent-based carrier fluid like isopropyl alcohol or methanol. Aqueous-based carrier fluids have not typically been used because many known consolidating agents are not soluble or dispersible in water. Problematically, solvent-based carrier fluids usually have a relatively low flash point, which creates safety risks for the transportation of and other operations involving the use of those carrier fluids. Some known consolidating agents comprises a mixture of a furan-based resin derived from furfuryl alcohol. Such mixtures include furfural with the furan-based resin because furfural provides additional polymerization as the resin source, and to help lower the viscosity of the resin mixture. These consolidating agents typically do not comprise an aqueous fluid, because the presence of water on the surface to be consolidated is thought to weaken the bonding between the resin and substrates, preventing the substrates from achieving high cohesion. Accordingly, direct mixing of furan based resin and furfuryl alcohol with water has often been avoided.

SUMMARY

The present invention relates to methods and compositions useful in treating existing or placed solids in subterranean formations, and more particularly, to stabilizing relatively unconsolidated portions of subterranean formations, and minimizing the flow back and/or production of unconsolidated particulate material (referred to collectively herein as "particulate migration").

Certain methods provided herein comprise providing a polymerizable treatment fluid that comprises furfuryl alcohol monomer dispersed in an aqueous base fluid; introducing the polymerizable treatment fluid to a portion of a subterranean formation; and allowing the polymerizable treatment fluid to polymerize in the subterranean formation.

Further provided herein are methods of stabilizing a portion of a subterranean formation comprising providing a polymerizable treatment fluid that comprises furfuryl alcohol monomer dispersed in an aqueous base fluid; introducing the polymerizable treatment fluid to an unconsolidated portion of a subterranean formation and allowing polymerizable treatment fluid to penetrate at least a portion of the near well bore area of the unconsolidated portion of the formation; and allowing the polymerizable treatment fluid to polymerize in the subterranean formation such that at least a portion of the unconsolidated or loosely consolidated particulates therein are stabilized.

Also provided herein are methods of stabilizing a portion of a subterranean formation comprising providing a polymerizable treatment fluid that comprises furfuryl alcohol monomer dispersed in an aqueous base fluid; introducing the polymerizable treatment fluid to an unconsolidated portion of a subterranean formation; contacting the polymerizable treatment fluid with an initiator compound; and allowing the polymerizable treatment fluid to polymerize in the subterranean formation such that at least a portion of the unconsolidated or loosely consolidated particulates therein are stabilized.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 1 illustrates that an increase in the furfuryl alcohol monomer concentration in certain embodiments of the polymerizable treatment fluids of the present invention can affect the consolidation strength of a treated sand pack.

DESCRIPTION OF THE PREFERRED EMBODIMENTS

The present invention relates to methods and compositions useful in treating existing or placed solids in subterranean formations, and more particularly, to stabilizing relatively unconsolidated portions of subterranean formations, and minimizing the flow back and/or production of unconsolidated particulate material (referred to collectively herein as "particulate migration").

Among the many potential advantages of the methods and compositions of the present invention, one advantage is that polymerized furfuryl alcohol monomers are used to stabilize formation fines and other unconsolidated particulate materials and solids and reduce particulate migration within a subterranean formation. The particulate materials and solids that are stabilized may be native to the formation or may have been introduced to the formation, for example, proppant and/or gravel introduced in the course of another treatment operation in the subterranean formation. The polymerization of the furfuryl alcohol monomers in the polymerizable treatment fluids may provide adhesive bonding between formation particulates to minimize their migration in and/or production out of the formation in an effort to reduce their potential negative impact on permeability and/or fracture conductivity. In some embodiments, the polymerization of the furfuryl alcohol monomer may cause formation particulates to become involved in collective stabilized masses and/or stabilize the formation particulates in place to prevent their migration that might negatively impact permeability and/or fracture conductivity. As used herein, the term "furfuryl alcohol monomer" refers to unpolymerized or oligomerized furfuryl alcohol.

In some embodiments, the polymerizable treatment fluids of the present invention may be used to reduce production of formations fines with the production fluid (e.g., oil or gas), and to maintain the production of the well. Another potential advantage of some polymerizable treatment fluids that comprise a furfuryl alcohol monomer is that that the furfuryl alcohol monomer is generally soluble in water. Accordingly, the furfuryl alcohol monomers may be introduced to a subterranean formation in an aqueous carrier fluid. Aqueous carrier fluids generally have a much higher flash point than many traditional solvent-based carrier fluids, like isopropyl alcohol or methanol, that have been used to introduce solvent-based consolidating agents to a subterranean formation. A higher flash point may make transportation of and other operations involving the treatment fluids safer than operations involving consolidating agents in lower flash point carrier fluids. Another advantage may be that because furfuryl alcohol monomer may be completely dispersed and/or dissolved in an aqueous base fluid, the concentration of monomer in the aqueous base fluid is adjustable as needed. Depending on the concentration of furfuryl alcohol monomer present in the polymerizable treatment fluid, various levels of particulate cohesion and/or formation consolidation can be established based on the treatment design objective.

Also, polymerizable treatment fluids that comprise furfuryl alcohol monomer and an aqueous base fluid may have a lower viscosity than some conventional consolidating agents. In addition furfuryl alcohol monomers have a smaller molecular structure than furfuryl alcohol resins, such as furan-furfuraldehyde. This low viscosity and small molecular structure may allow deeper penetration of the polymerizable treatment fluid into the subterranean formation, thus consolidating a deeper portion of the subterranean formation. Furthermore, some polymerizable treatment fluids of the present invention which polymerize in situ form an ultra-thin coating on formation particulates which consolidate the particulates without unnecessary blockage of flow paths through the formation. In some embodiments, the polymerizable treatment fluids of the present invention are substantially free of resins that are not dispersible in water, for example, a furan-based resin.

In some embodiments, the methods of the present invention comprise providing a polymerizable treatment fluid that comprises furfuryl alcohol monomer dispersed in an aqueous base fluid; introducing the polymerizable treatment fluid to a portion of a subterranean formation; and allowing the polymerizable treatment fluid to polymerize in the subterranean formation. According to some embodiments, it is believed that the size of the molecular structure of furfuryl alcohol is small enough that it may allow deep penetration of the furfuryl alcohol into the porous medium of tight formations.

Polymerizable treatment fluids that are used in accordance with the present invention generally comprise furfuryl alcohol monomer dispersed and/or dissolved in an aqueous base fluid. Accordingly, in exemplary embodiments, the polymerizable treatment fluid is substantially free of emulsion droplets or particles. The substantial absence of emulsion droplets (e.g., internal resin droplets) may be beneficial, because such droplets typically have a diameter of about 1 to about 5 microns, and tend to plug pore spaces that are about 10 microns wide or less, thereby decreasing the permeability of the formation. In some embodiments, a polymerizable treatment fluid of the present invention comprises furfuryl alcohol monomer in an amount in the range of about 0.1% to about 90% by weight of the polymerizable treatment fluid. In some embodiments, furfuryl alcohol monomer is present in an amount in the range of about 0.1% to about 20% by weight of the polymerizable treatment fluid, in the range of about 0.1% to about 10% by weight of the polymerizable treatment fluid, in the range of about 0.1% to about 5% by weight of the polymerizable treatment fluid, and/or in the range of about 1% to about 3% by weight of the polymerizable treatment fluid. The amount of furfuryl alcohol monomer used in the polymerizable treatment fluid may depend on the type of treatment application in which the polymerizable treatment fluid is used, and the temperature of the subterranean formation where it is used. In some embodiments, the pH of the polymerizable treatment fluid may desirably be less than about 4, and in some embodiments less than about 3.

Aqueous base fluids that are suitable for use in a polymerizable treatment fluid of the present invention include fresh water, salt water, brine, seawater, or any other aqueous liquid that does not adversely react with the other components used in accordance with this invention or within the subterranean formation. As used here, the term "salt" is used in its ordinary meaning, referring to materials commonly used in the industry in the preparation of completion brines; and including materials such as potassium chloride, sodium chloride, ammonium chloride, calcium chloride, and calcium bromide. In some embodiments, an aqueous base fluid that comprises a brine may be desirable because the brine may reduce swelling of clay that is present in the subterranean formation, thus preventing the clay from swelling and blocking the flowpath. According to some embodiments, the aqueous base fluid has a low viscosity. For example, in some embodiments, the viscosity of the aqueous base fluid may be in the range of about 0.5 cP to about 5 cP. In some embodiments, the viscosity of the aqueous base fluid may be in the range of about 1 cP to about 3 cP.

The furfuryl alcohol monomer in a polymerizable treatment fluid may polymerize in response to activation by an initiator compound or may self-polymerize at elevated temperatures. In general, if the polymerizable treatment fluid is introduced to a subterranean formation having a bottomhole temperature of about 250° F. or higher, no initiator compound is necessary to activate polymerization of the furfuryl alcohol monomer. In some embodiments, e.g., embodiments in which a subterranean formation has a bottomhole temperature less than about 250° F., the furfuryl alcohol monomer in the polymerizable treatment fluid may be contacted with an initiator compound in order to initiate polymerization.

Suitable initiator compounds for use in connection with the polymerizable treatment fluids of the present invention may include organic acids, inorganic acids, acid anhydrides, or water soluble multivalent metal salts, mixtures thereof and the like. Some initiator compounds that may be used are acid initiator compounds. Examples of organic acids and acid anhydrides that may be suitable initator compounds include maleic anhydride, phthalic anhydride, maleic acid, malic acid, phthalic acid, trichloroacetic acid, formic acid, oxalic acid, oxalic anhydride, pyromellitic dianhydride, dodecynyl succinic anhydride, hexahydrophthalic anhydride benzoic trichloride, hexachloroacetone, sodium trichloroacetate, sodium trifluoroacetate, and combinations thereof. A water soluble multivalent metal salt may comprise at least one of the following: a manganese ion, a zinc ion, a cadmium ion, a magnesium ion, a cobalt ion, a nickel ion, an iron ion, a lead ion, a calcium ion, a copper ion, and a tin ion. Suitable initiator compounds may also include delay acting initiator compounds. Examples of delay acting initiator compounds that may be suitable include block acids such as sulfonic acid, sulfamic acid, glycolic acid, and certain esters which are delay-acting catalysts, i.e., esters that slowly hydrolyze to release an acid that acts as an initiator compound. Examples of oil soluble initiators include dinonylnaphthalene disulfonic acid, alkylnaphthalene disulfonic acid, phosphoric acid, phthaloyl chloride, and phthalic anhydride.

An initiator compounded may be included in a polymerizable treatment fluid or contact a polymerizable treatment fluid in an amount capable of activating polymerization of the furfuryl alcohol monomer under the prevailing conditions, e.g., subterranean temperature, and at the desired time. In some embodiments, an initiator compound that contacts a polymerizable treatment fluid and/or is present in a polymerizable treatment fluid is present in an amount in a range of from about 0.1% to about 10% by weight of the polymerizable treatment fluid. In some embodiments, the initiator compound may be present in an amount in the range of from about 1% to about 3% by weight of the polymerizable treatment fluid. One of ordinary skill in the art with the benefit of this disclosure will be able to select an appropriate initiator compound and the appropriate amount to activate polymerization of the furfuryl alcohol monomer in the polymerizable treatment fluid. It is thought that in some embodiments, polymerization of the furfuryl alcohol monomer may be initiated through a reaction that comprises the following reaction mechanism:

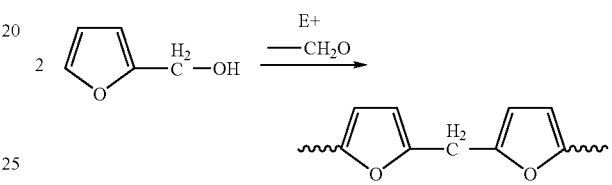

In some embodiments, methods of the present invention comprise providing a polymerizable treatment fluid that comprises furfuryl alcohol monomer dispersed in an aqueous base fluid that contains an initiator compound; introducing the polymerizable treatment fluid to an unconsolidated portion of a subterranean formation; and allowing the polymerizable treatment fluid to polymerize in the subterranean formation such that at least a portion of the unconsolidated or loosely consolidated particulates therein are stabilized.

In some embodiments, the polymerizable treatment fluids of the present invention may further comprise a silane coupling agent, e.g., an organosilane coupling agent. The optional silane coupling agent may be used, among other things, to act as a mediator to help bond the polymerized furfuryl alcohol monomer to formation particulates. The term "organosilane coupling agent" as used herein refers to a compound having at least two reactive groups of different types bonded to a silicon atom. One of the reactive groups of different types is reactive with various inorganic materials such as glass, metals, silica sand and the like and may form a chemical bond with the surface of such inorganic materials; while the other reactive group is reactive with various kinds of organic materials and may form a chemical bond with the polymerizing or polymerized furfuryl alcohol monomer. As a result, some organosilane coupling agents are capable of providing enhanced chemical bonding between an organic material and an inorganic material.

While a organosilane coupling agent which is reactive with the polymerizing or polymerized furfuryl alcohol monomer may generally be suitable for use, examples of organosilane silane coupling agents that may be suitable include, N-2-(aminoethyl)-3-aminopropyltrimethoxysilane; 3-glycidoxypropyltrimethoxysilane; γ-aminopropyltriethoxysilane; N-beta-(aminoethyl)-γ-amino-propyltrimethoxysilanes, aminoethyl-N-beta-(aminoethyl)-γ-aminopropyl-trimethoxysilanes; γ-ureidopropyl-triethoxysilanes; beta-(3-4 epoxycyclohexyl)-ethyl-trimethoxysilane; γ-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; γ-glycidoxypropyltrimethoxysilane; γ-glycidoxypropylmethylidiethoxysilane; N-beta (aminoethyl)-γ-aminopropyltrimethoxysilane; N-beta (aminoethyl)-γ-aminopropylmethyldimethoxysilane; 3-aminopropyltriethoxysilane; N-phenyl-γ-aminopropyltrimethoxysilane; γ-mercaptopropyltrimethoxysilane; Vinyltris (beta-methoxyethoxy) silane; γ-metacryloxypropyltrimethoxysilane beta-(3,4 epoxycyclohexyl)-ethyltrimethoxysilane; γ-glycidoxypropyltrimethoxysilane; γ-glycidoxypropyl-methyl-diethoxysilane; N-beta (aminoethyl)-raminopropylmethyldimethoxysilane; γ-aminopropyl-triethoxysilane; and combinations thereof.

A silane coupling agent may be included in the polymerizable treatment fluid in an amount capable of sufficiently bonding the polymerized furfuryl alcohol monomer to the formation fines and/or sand. In some embodiments of the present invention, a silane coupling agent used is included in the polymerizable treatment fluid in an amount in the range of about 0.1% to about 3% by weight of the polymerizable treatment fluid, and preferably in the range of about 0.5% to about 2% by weight of the polymerizable treatment fluid.

In some embodiments, the polymerizable treatment fluid may further comprise a surfactant which facilitates the coating of the furfuryl alcohol monomer onto particulates. Examples of suitable surfactants include, but are not limited to, alkyl phosphonate surfactants (e.g., a $C_{12}$-$C_{22}$ alkyl phosphonate surfactant), ethoxylated nonyl phenol phosphonate esters, cationic surfactants, nonionic surfactants, and mixtures of one or more cationic and nonionic surfactants. Generally, the surfactant is present in the polymerizable treatment fluid in an amount sufficient to facilitate the wetting of the formation particulates, sand, proppant or other particulate matter being consolidated. In particular embodiments, the surfactant may be present in the polymerizable treatment fluid in an amount from about 0.01% to about 5% by weight of the polymerizable treatment fluid, and preferably from about 0.25% to about 2% by weight of the polymerizable treatment fluid.

The methods of the present invention may be employed in conjunction with various pre-flush and post-flush treatments to support a reduction in particulate migration. For example, a pre-flush fluid comprising a brine and a surfactant may be introduced to the subterranean formation before a polymerizable treatment fluid comprising furfuryl alcohol monomer and an aqueous base fluid. The surfactant may condition the surface of the formation sand so that it is more easily wet with the polymerizable treatment fluid. Examples of suitable surfactants include, but are not limited to, alkyl phosphonate surfactants (e.g., a $C_{12}$-$C_{22}$ alkyl phosphonate surfactant), ethoxylated nonyl phenol phosphonate esters, cationic surfactants, nonionic surfactants, and mixtures of one or more cationic and nonionic surfactants. Generally, the surfactant is present in the polymerizable treatment fluid in an amount sufficient to facilitate the wetting of the formation particulates, sand, proppant or other particulate matter being consolidated. In particular embodiments, the surfactant may be present in the polymerizable treatment fluid in an amount from about 0.01% to about 5% by weight of the polymerizable treatment fluid, and preferably from about 0.25% to about 2% by weight of the polymerizable treatment fluid In some embodiments, depending on the concentration of the furfuryl alcohol monomer in the polymerizable treatment fluid, the polymerizable treatment fluid may be followed by introduction of a post-flush fluid into the subterranean formation. In exemplary embodiments, the post-flush fluid may comprise a gas, such as nitrogen or carbon dioxide, a hydrocarbon based fluid such as diesel or kerosene, or other aqueous base fluid. In some embodiments, a post-flush fluid is used to displace excess polymerizable treatment fluid from the pore channels of the subterranean formation and to force the polymerizable treatment fluid further into the subterranean formation. In some embodiments the post-flush fluid is placed into the formation at a matrix flow rate such that the polymerizable treatment fluid is displaced from the pore spaces, but is not displaced from its desired location between the formation sand particles.

In embodiments in which an initiator compound is used to initiate polymerization of furfuryl alcohol monomer, the initiator compound may be introduced to the subterranean formation in a variety of ways. For example, the initiator compound can be included in a pre-flush fluid that is placed in a subterranean treatment fluid in advance of a polymerizable treatment fluid to allow the initiator compound to pre-coat the formation sand surface prior to being contacted with a furfuryl alcohol monomer. In some embodiments, an initiator compound is a component of or mixed with the polymerizable treatment fluid before the polymerizable treatment fluid is introduced to a subterranean formation. In other embodiments, an initiator compound may be introduced to the subterranean formation after the polymerizable treatment fluid, e.g., as part of a post-flush fluid, such as an oil-soluble acid dissolved in a diesel post-flush fluid.

In some embodiments, one or more of the various treatment fluids used in connection with the present invention may be prepared "on-the-fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. For example, a polymerizable treatment fluid may be prepared by continuously combining (a) an aqueous base fluid that contains an initiator compound, with (b) a liquid that comprises a furfuryl alcohol monomer and an organosilane coupling agent. As these two liquids are continuously combined, the resultant mixture is pumped into a subterranean formation. Furthermore, in some embodiments, one or more of the various treatment fluids used in connection with the present invention may be batch mixed. For example, a polymerizable treatment fluid may be prepared by batch mixing an aqueous base fluid, furfuryl alcohol monomer, an organosilane coupling agent, and a delay acting initiator compound.

In some embodiments, the polymerizable treatment fluids of the present invention may comprise a ductility imparting agent and/or a surfactant. Among other things, a ductility imparting agent improves the polymerized furfuryl alcohol monomer's ability to endure changes in the subterranean environment. Examples of suitable ductility imparting agents are phthalate and phthalate materials such as diethyl phthalate, butyl benzyl phthalate, di-(2-ethylhexyl)phthalate, and combinations thereof. In some embodiments, a ductility imparting agent is present in a polymerizable treatment fluid in an amount in the range of from about 0.1% to about 10% by weight of the furfuryl alcohol monomer.

Optionally, the polymerizable treatment fluids of the present invention may contain additional additives such as clay stabilizers, oxygen scavengers, corrosion inhibitors, scale inhibitors, iron control agents, antifoam agents, dispersants, viscosifiers, weighting agents, wetting agents, coating enhancement agents, and the like, or any other additive that does not adversely affect the treatment fluid. Optionally, a polymerizable treatment fluid that comprises furfuryl alcohol monomer in an aqueous base fluid may further comprise a stabilizer such as sodium tetraborate decahydrate or lignosulfonic acid to stabilize the dispersion and/or dissolution of furfuryl acid monomer in the polymerizable treatment fluid.

In some embodiments, the pre-flush fluid may further comprise a foaming agent. As used herein, the term "foamed" also refers to co-mingled fluids. In certain embodiments, it may be desirable that the pre-flush fluid is foamed to, inter alia, provide enhanced placement of the pre-flush fluid and the polymerizable treatment fluid to be injected following the pre-flush fluid, and/or to reduce the amount of aqueous base fluid that may be required, e.g. in water-sensitive subterranean formations. Various gases can be utilized for foaming the pre-flush fluid of this invention, including, but not limited to, nitrogen, carbon dioxide, air, and methane, and mixtures thereof. One of ordinary skill in the art, with the benefit of this disclosure, will be able to select an appropriate gas that may be utilized for foaming the pre-flush fluids of the present invention. In some embodiments, the gas may be present in a pre-flush fluid of the present invention in an amount in the range of about 5% to about 98% by volume of the pre-flush fluid. In some embodiments, the gas may be present in a pre-flush fluid of the present invention in an amount in the range of about 20% to about 80% by volume of the pre-flush fluid. In some embodiments, the gas may be present in a pre-flush fluid of the present invention in an amount in the range of about 30% to about 70% by volume of the pre-flush fluid. The amount of gas to incorporate into the pre-flush fluid may be affected by factors, including the viscosity of the pre-flush fluid and wellhead pressures involved in a particular application.

In those embodiments where it is desirable to foam the pre-flush fluid, surfactants such as HY-CLEAN (HC-2)™ surface-active suspending agent, PEN-5™, or AQF-2™ additive, all of which are commercially available from Halliburton Energy Services, Inc., of Duncan, Okla., may be used. Additional examples of foaming agents that may be utilized to foam the pre-flush fluids may include, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable foaming agents and foam-stabilizing agents may be included as well, which will be known to those skilled in the art with the benefit of this disclosure.

The polymerizable treatment fluids of the present invention may be used in connection with a variety of subterranean treatments. In some remedial embodiments of the present invention, after a fracturing treatment or a gravel pack treatment has been performed, a polymerizable treatment fluid of the present invention may be introduced into an unconsolidated portion of a subterranean formation to stabilize particulates within the unconsolidated portion. The polymerizable treatment fluid may disperse any loose fines within a proppant pack in a fracture, moving the fines away from the fracture (or near well bore area) and locking them in place. In exemplary embodiments, this may result in fines stabilization without damaging the permeability of the formation. The polymerizable treatment fluid may stabilize gravel particulates around a screen and formation sand and fines particulates surrounding the well bore to remediate a screen failure. In addition to remedial treatments, a polymerizable treatment fluid may be introduced to a subterranean formation as part of a pre-pad fluid in a gravel packing treatment, frac-packing treatment, or extension-pack treatment or hydraulic fracturing treatment. Additionally, the polymerizable treatment fluids may be used in the treatment of a formation following an acid treatment, e.g., to stabilize the near-well bore region of the formation, the part of the formation surrounding the wormholes or channels created by the acid treatment, and/or the fracture faces of the formation. In view of the foregoing, one of skill in the art will appreciate the variety of subterranean operations which may employ polymerizable treatment fluids comprising a furfuryl alcohol monomer in an aqueous base fluid to stabilize a subterranean formation and reduce particulate migration, including the production of particulates.

Examples embodiments in which the polymerizable treatment fluids of the present invention may be used in combination with one or more other subterranean treatments include using a polymerizable treatment fluid to stabilize and consolidate proppant particulates that are present in a fracture created during a fracturing operation, and/or using a polymerizable treatment fluid to treat a formation before gravel packing. According to some embodiments, the portion of the subterranean formation to which a polymerizable treatment fluid is introduced may be in or near a fracture in a subterranean formation, for example, a fracture which was created during a fracturing operation and which comprises proppant particulates. The polymerization of the polymerizable treatment fluid may stabilize the proppant particulates in the fracture and reduce migration of the proppant from the fracture. According to some embodiments, the polymerizable treatment fluid of the present invention may be introduced into a portion of a subterranean formation as part of a pre-pack procedure before a gravel packing treatment is conducted. In some such embodiments, the polymerizable treatment fluid is allowed to at least partially polymerize before the gravel packing job is complete. This may have the advantage of consolidating relatively unconsolidated particulates and solids to prevent particulate migration into the gravel pack.

According some embodiments, the polymerizable treatment fluids of the present invention may be introduced to a well bore in a drilling fluid. For example, the polymerizable treatment fluids of the present invention may be used as, or as a component of, a "drill-in" fluid that is circulated in a well bore while drilling through a hydrocarbond producing formation interval. When used as part of a drilling fluid, the polymerizable treatment fluid may penetrate or leak off into the area around the well bore, for example penetrating a few inches, and/or 1 to 2 well bore diameters, into the formation. When the polymerizable treatment fluid polymerizes in the area that it has penetrated, it may stabilize the solids in that area of the formation, including consolidating relatively unconsolidated particulates in the area.

To facilitate a better understanding of the present invention, the following examples of certain aspects of some embodiments are given. In no way should the following examples be read to limit, or define, the entire scope of the invention.

Example 1

Multiple experimental sand packs were prepared by mixing 135 grams of Oklahoma sand (70/170-mesh) and 15 grams of silica flour. Polymerizable aqueous solutions with a volume of 25 mL were prepared by mixing various amounts of 3% KCl brine, maleic anhydride, furfuryl alcohol monomer, and silane coupling agent (SILQUEST® A-1120 Silane, N(beta-aminoethyl) gamma-aminopropymethyldimethoxysilane, a silane coupling agent commercially available from Momentive Performance Materials Inc. of Wilton, Conn.) into a homogenous solution. The sand mixture was then poured into the polymerizable aqueous solution and stirred with a spatula to form a slurry. The slurry was then packed into a brass cell containing a TEFLON® (polytetrafluoroethylene) liner. Both top and bottom ends of the cell were capped as a closed system during curing. The cell was placed in an oven to cure at 250° F. for 48 hours. After curing, the consolidated sand pack was removed from the cell, and cut into cores for unconfined compressive strength ("UCS") measurements. Table 1 and FIG. 1 summarize the compositions prepared in various tests and their consolidation results.

TABLE 1

| Components of polymerizable fluid | Test 1 | Test 2 | Test 3 | Test 4 |
|---|---|---|---|---|
| 3% KCl brine (mL) | 23.5 | 22 | 20.75 | 19.5 |
| Maleic anhydride (g) | 0.5 | 0.5 | 0.5 | 0.5 |
| Furfuryl alcohol monomer (mL) | 1.25 | 2.5 | 3.75 | 5.0 |
| Organosilane A-1120 (mL) | 0.5 | 0.5 | 0.5 | 0.5 |

Example 2

Sand packs were prepared by mixing 88% w/w of 70/170-mesh sand with 10% w/w of 325-mesh silica flour, and 2% w/w of bentonite clay to form a homogeneous sand mixture. The sand mixture was then packed into TEFLON® sleeves that have an inside diameter of 1 inch and a length of 4 inches. About 0.5 inches of both top and bottom sections of TEFLON® sleeve were filled with 40/70-mesh sand to keep the sand mixture in place during resin treatment. The TEFLON® sleeves were heated to 250° F. in heated jackets overnight so that the sand packs could be treated at a temperature similar to that typically encountered in a well bore.

For one test, a resin composition was prepared by combining 88 mL of 3% KCl brine, 1 gram of maleic anhydride, 10 mL (i.e., 10% v/v) of furfuryl alcohol monomer, and 2 mL of a silane coupling agent (SILQUEST® A-1120 Silane, N(beta-aminoethyl) gamma-aminopropymethyldimethoxy-silane, a silane coupling agent commercially available from Momentive Performance Materials Inc. of Wilton, Conn.). For another test, a resin composition was prepared by combining 78 mL of 3% KCl brine, 1 gram of maleic anhydride, 20 mL (i.e., 20% v/v) of furfuryl alcohol monomer, and 2 mL of SILQUEST® A-1120 Silane (N(beta-aminoethyl) gamma-aminopropymethyldimethoxy-silane). The resin treatment of a sand pack included (1) injecting a preflush of 150 mL of 3% KCl brine containing 0.25% of a cationic surfactant (19N™, a cationic surfactant commercially available from Halliburton, Duncan, Okla.) at a flow rate of 10 mL/min, (2) injecting one of the prepared resin compositions at 10 mL/min, and (3) injecting a post-flush of nitrogen gas at 12 L/min for 3 minutes. After a resin treatment, the treated sand packs were shut in at 250° F. for 48 hours to allow the resin to completely cure. After the curing period, 3% KCl brine was injected to establish flow through the treated sand pack.

It was observed that after resin treatment with either of the prepared resin compositions, the treated sand packs re-established flow rates as high as the flow rate of the pre-flushes, indicating that their post-treatment permeabilities are comparable to their initial permeabilities. The consolidated sand packs were removed from the TEFLON® sleeves and cut into cores for unconfined compressive strength (UCS) and tensile strength measurements. Table 2 below shows a summary of these values.

TABLE 2

| | 10% v/v furfuryl alcohol monomer | 20% v/v furfuryl alcohol monomer |
|---|---|---|
| Segment 1 - USC (psi) | 74 | 83 |
| Segment 2 - Tensile (psi) | 80 | 269 |
| Segment 3 - Tensile (psi) | 195 | 403 |

Example 3

In another series of tests, the following initiator compounds were used as catalysts to initiate the polymerization of furfuryl alcohol monomer: sodium trifluoroacetate (STFA), sodium trichloroacetate (STCA), hexachloro acetone (HCA), and benzoic trichloride (BTC). The composition of the furfuryl alcohol monomer solution comprised 80 mL of 3% KCl brine, 0.25 mL of a cationic surfactant (19N™, a cationic surfactant commercially available from Halliburton, Duncan, Okla.), 1.0 mL of a silane coupling agent (SILQUEST® A-1120 Silane, N(beta-aminoethyl) gamma-aminopropymethyldimethoxy-silane), 20 mL of furfuryl alcohol monomer, and 5.0 grams of a solid or 2.5 mL of a liquid initiator compound. The sand packs were prepared by packing sand that has a particle size distribution of 70/170-mesh into brass cells. Each brass cell had an inside diameter (ID) of 1.375 inches and a length of 6 inches. Wired mesh screens of 100-mesh were placed at the bottom and on top of the sand pack.

The resin treatment of a sand pack include (1) saturating the sand packed in the brass cell with 150 cc of 3% KCl brine, (2) injecting a pre-flush of 150 mL of 3% KCl brine containing 0.25% of a cationic surfactant (19N™, a cationic surfactant commercially available from Halliburton, Duncan, Okla.) at a flow rate of 25 mL/min, (3) injecting 100 mL of the prepared furfuryl monomer compositions at 25 mL/min, and (4) injecting a post-flush of nitrogen gas at 12 L/min for 2 minutes. After a resin treatment, the treated sand packs were shut in at designated temperatures for 48 hours to allow the polymerizable treatment fluid to cure. After the curing period, the treated sand packs were allowed to cool down to room temperature before extrusion from the cells, and being cut into cores for unconfined compressive strength (UCS) and tensile strength measurements. The results of these measurements are shown in Table 3.

TABLE 3

| Test # | Catalyst | Cure Temperature (° F.) | UCS (psi) | Tensile (psi) |
|---|---|---|---|---|
| 1 | STFA | 100 | 0 | NA |
| 2 | STFA | 150 | 0 | NA |
| 3 | STCA | 180 | 10 | NA |
| 4 | STCA | 200 | 30 | NA |
| 5 | HCA | 125 | 1,600 | NA |
| 6 | HCA | 150 | 1,460 | NA |
| 7 | HCA | 200 | 1,905 | 640 |
| 8 | HCA | 100 | 1,075 | 320 |
| 9 | BTC | 100 | 925 | 250 |
| 10 | BTC | 125 | 1,120 | 690 |
| 11 | BTC | 150 | 1,495 | 850 |
| 12 | BTC | 200 | 1,365 | 890 |

Example 4

In another series of tests, maleic anhydride was sued as a catalyst to initiate the polymerization of furfuryl alcohol monomer. In Test No. 13, the composition of the furfuryl alcohol monomer solution comprised 80 mL of 3% KCl brine, 0.25 mL of a cationic surfactant (19N™, a cationic surfactant commercially available from Halliburton, Duncan, Okla.), 1.0 mL of a silane coupling agent (SILQUEST® A-1120 Silane, N(beta-aminoethyl) gamma-aminopropymethyldimethoxy-silane), and 20 mL of furfuryl alcohol monomer. In Test No. 14, the composition of the furfuryl alcohol monomer solution comprised 80 mL of 3% KCl brine, 0.25 mL of a cationic surfactant (19N™, a cationic surfactant commercially available from Halliburton, Duncan, Okla.), 1.0 mL of a silane coupling agent (SILQUEST® A-1120 Silane, N(beta-aminoethyl) gamma-aminopropymethyldimethoxy-silane), 20 mL of furfuryl alcohol monomer, and 2.0 grams of maleic anhydride. The sand packs were prepared by packing sand with a particle size distribution of 70/170-mesh into brass cells. Each brass cell had an inside diameter (ID) of 1.375 inches and a length of 6 inches. Wired mesh screens of 100-mesh were placed at the bottom and on top of the sand pack.

The resin treatment of a sand pack included (1) saturating the sand packed in the brass cell with 150 cc of 3% KCl brine, (2) injecting a preflush of 150 mL of 3% KCl brine containing 0.25% of a cationic surfactant (19N™, a cationic surfactant commercially available from Halliburton, Duncan, Okla.) at a flow rate of 25 mL/min, and (3) injecting 100 mL of the prepared furfuryl monomer compositions at 25 mL/min. No post-flush fluid was injected through the treated sand packs. After a resin treatment, the treated sand packs were shut in at 230° F. for 24 hours to allow the polymerizable treatment fluid to cure. After the curing period, the treated sand packs were allowed to cool down to room temperature before being extruded out of the cells, and core sizes were obtained for UCS measurements. The results of the UCS measurements are shown in Table 4.

TABLE 4

| Test No. | Catalyst | Cure Temp (° F.) | UCS (psi) |
|---|---|---|---|
| 13 | None | 230 | 120 |
| 14 | Maleic anhydride | 230 | 1,790 |

Example 5

In another series of tests, maleic anhydride was used as catalyst to initiate the polymerization of furfuryl alcohol monomer. The composition of the furfuryl alcohol monomer solution comprised 80 mL of 3% KCl brine, 0.25 mL of a cationic surfactant (19N™, a cationic surfactant commercially available from Halliburton, Duncan, Okla.), 1.0 mL of a silane coupling agent (SILQUEST® A-1120 Silane, N(beta-aminoethyl) gamma-aminopropymethyldimethoxy-silane), 20 mL of furfuryl alcohol monomer, and 2.0 grams of maleic anhydride. Sand packs were prepared by first mixing 88% w/w of 70/170-mesh sand with 10% w/w of 325-mesh silica flour, and 2% w/w of bentonite clay to form a homogeneous sand mixture. The sand mixture was then packed into TEFLON® sleeves that had an inside diameter of 1 inch and a length of 4 inches. About 0.5 inches of both top and bottom sections of the TEFLON® sleeves were filled with 40/70-mesh sand to keep the sand mixture in place during resin treatment. The TEFLON® sleeves were heated to 230° F. in heated jackets overnight so that the sand packs could be treated at a temperature similar to that typically encountered in a well bore.

The back pressure was set with a pressure regulator at 100 psi. For Test No. 15, the sand pack was first treated with 7% KCl brine at 15 cc/min for a volume of about 1 L. After this fluid volume, nitrogen at a flow rate of 12 L/min was applied for 2 minutes. For initial permeability measurement, 7% KCl brine was injected into the sand pack at 15 cc/min for a volume of about 1.5 L until a steady pressure drop was obtained. The sand pack was heated to 230° F. For pre-flush treatment, 120 cc of 3% KCl brine containing 0.25% 19N was injected into the sand pack at 3 cc/min. Next, the polymerizable treatment fluid including 80 cc of 20% FA monomer mixture was injected into the sand pack at 3 cc/min. The post-flush involved injecting nitrogen at 12 L/min for 3 minutes. The treated sand pack was shut in and cured for 24 hours at 230° F. After the curing period, 7% KCl brine was injected through the sand pack at 15 cc/min for about 1 L until a steady pressure drop was obtained to determine final permeability. The treated sand pack was allowed to cool down to room temperature, before being extruded out of the TEFLON® sleeve, and core sizes were obtained for unconfined compressive strength and tensile strength measurements.

Test No. 16 was performed using a procedure similar to that of Test No. 15, except that the nitrogen post-flush fluid of Test No. 15 was replaced with 40 cc of 3% KCl brine that was injected into the sand pack at 3 cc/min. Table 5 shows a summary of retained permeabilities, unconfined compressive strength (UCS), and tensile strength measurements obtained in Test No. 15 and Test No. 16.

TABLE 5

| Test # | Retained Permeability (%) | UCS (psi) | Tensile (psi) |
|---|---|---|---|
| 15 | 66 | 1,220 | 305 |
| 16 | 43 | 290 | 195 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:
1. A method comprising:
    providing a polymerizable treatment fluid that comprises furfuryl alcohol monomer dispersed in an aqueous base fluid;

introducing the polymerizable treatment fluid to a portion of a subterranean formation having a temperature of above about 250° F.;
contacting the polymerizable treatment fluid with an initiator compound wherein the initiator compound comprises at least one initiator compound selected from the group consisting of: an organic acid, an inorganic acid, an acid anhydride, and a water soluble multivalent metal salt; and
allowing the polymerizable treatment fluid to polymerize in the subterranean formation.

2. The method of claim 1 wherein allowing the polymerizable treatment fluid to polymerize in the subterranean formation comprises contacting the furfuryl alcohol monomer with an initiator compound.

3. The method of claim 2 wherein contacting the furfuryl alcohol monomer with an initiator compound comprises contacting the polymerizable treatment fluid with the initiator compound before the polymerizable treatment fluid is introduced to the portion of the subterranean formation.

4. The method of claim 2 wherein the initiator compound comprises at least one initiator compound selected from the group consisting of: an organic acid, an inorganic acid, an acid anhydride, and a water soluble multivalent metal salt.

5. The method of claim 4 wherein the initiator compound comprises at least one initiator compound selected from the group consisting of: maleic anhydride, phthalic anhydride, maleic acid, malic acid, phthalic acid, trichloroacetic acid, formic acid, oxalic acid, sulfonic acid, sulfamic acid, glycolic acid, and an ester that released one of the foregoing initiator compounds.

6. The method of claim 1 wherein the polymerizable treatment fluid further comprises an organosilane coupling agent.

7. The method of claim 1 wherein the polymerizable treatment fluid further comprises a surfactant.

8. The method of claim 1 wherein the furfuryl alcohol monomer is present in the polymerizable treatment fluid in an amount in the range of about 0.1% to about 50% by weight of the polymerizable treatment fluid.

9. The method of claim 1 further comprising introducing a post-flush fluid that comprises diesel to the portion of the subterranean formation.

10. The method of claim 1 wherein the subterranean formation has a bottom hole temperature of about 225° F. or higher, and the furfuryl alcohol monomer of the polymerizable treatment fluid self-polymerizes in the subterranean formation.

11. A method of stabilizing a portion of a subterranean formation comprising:
providing a polymerizable treatment fluid that comprises furfuryl alcohol monomer dispersed in an aqueous base fluid;
introducing the polymerizable treatment fluid to an unconsolidated portion of a subterranean formation having a temperature of above about 250° F. and allowing polymerizable treatment fluid to penetrate at least a portion of the near well bore area of the unconsolidated portion of the formation; and
allowing the polymerizable treatment fluid to self-polymerize in the subterranean formation having a temperature of above about 250° F. such that at least a portion of the unconsolidated or loosely consolidated particulates therein are stabilized.

12. The method of claim 11 wherein allowing the polymerizable treatment fluid to polymerize in the subterranean formation comprises contacting the furfuryl alcohol monomer with an initiator compound.

13. The method of claim 11 wherein the initiator compound comprises at least one initiator compound selected from the group consisting of: an organic acid, an inorganic acid, an acid anhydride, and a water soluble multivalent metal salt.

14. The method of claim 11 wherein the furfuryl alcohol monomer is present in the polymerizable treatment fluid comprises in an amount in the range of about 0.1% to about 50% by weight of the polymerizable treatment fluid.

15. The method of claim 11 wherein the subterranean formation has a bottom hole temperature of about 225° F. or higher, and the furfuryl alcohol monomer of the polymerizable treatment fluid self-polymerizes in the subterranean formation.

16. A method of stabilizing a portion of a subterranean formation comprising: providing a polymerizable treatment fluid that comprises furfuryl alcohol monomer dispersed in an aqueous base fluid;
introducing the polymerizable treatment fluid to an unconsolidated portion of a subterranean formation;
contacting the polymerizable treatment fluid with an initiator compound wherein the initiator compound comprises at least one initiator compound selected from the group consisting of: an organic acid, an inorganic acid, an acid anhydride, and a water soluble multivalent metal salt; and,
allowing the polymerizable treatment fluid to polymerize in the subterranean formation such that at least a portion of the unconsolidated or loosely consolidated particulates therein are stabilized.

17. The method of claim 16 wherein the polymerizable treatment fluid further comprises an organosilane coupling agent.

18. The method of claim 16 wherein the furfuryl alcohol monomer is present in the polymerizable treatment fluid in an amount in the range of about 0.1% to about 50% by weight of the polymerizable treatment fluid.

19. The method of claim 16 wherein the subterranean formation has a bottom hole temperature of about 225° F. or higher, and the furfuryl alcohol monomer of the polymerizable treatment fluid self-polymerizes in the subterranean formation.

* * * * *